United States Patent [19]

Habiger

[11] 4,260,132
[45] Apr. 7, 1981

[54] CONTROL VALVE WITH IMPROVED CENTERING AND DETENT MECHANISMS

[75] Inventor: Cyril W. Habiger, Joliet, Ill.

[73] Assignee: Caterpillar Tractor Co., Peoria, Ill.

[21] Appl. No.: 108,909

[22] PCT Filed: Aug. 6, 1979

[86] PCT No.: PCT/US79/00573

§ 371 Date: Aug. 6, 1979

§ 102(e) Date: Aug. 6, 1979

[87] PCT Pub. No.: WO81/00440

PCT Pub. Date: Feb. 19, 1981

[51] Int. Cl.³ ............................................. F15B 13/01
[52] U.S. Cl. .................................................. 251/297
[58] Field of Search ................... 251/297; 137/625.69

[56] References Cited

U.S. PATENT DOCUMENTS

| 3,093,116 | 6/1963 | Rood | 137/625.69 |
|---|---|---|---|
| 3,120,858 | 2/1964 | Markovich | 137/625.69 |
| 3,174,500 | 3/1965 | Johnson et al. | 251/297 |
| 3,247,768 | 4/1966 | Tennis | 91/26 |
| 3,438,399 | 4/1969 | Barnes et al. | 251/297 |
| 3,625,475 | 12/1971 | Stephens | 74/527 |
| 3,790,125 | 2/1974 | Swatty | 251/297 |
| 3,790,129 | 2/1974 | Pauls | 251/297 |
| 3,866,880 | 2/1975 | Schexnayder | 251/297 |
| 3,891,182 | 6/1975 | Schwerin | 251/297 |
| 4,049,235 | 9/1977 | Singleton | 251/297 |

FOREIGN PATENT DOCUMENTS

| 860072 | 1/1971 | Canada | 137/625.69 |
|---|---|---|---|
| 956203 | 10/1974 | Canada | 137/625.69 |
| 1475932 | 5/1969 | Fed. Rep. of Germany | 137/625.69 |
| 2506453 | 8/1976 | Fed. Rep. of Germany | 251/297 |

*Primary Examiner*—William R. Cline
*Assistant Examiner*—H. Jay Spiegel
*Attorney, Agent, or Firm*—Phillips, Moore, Weissenberger, Lempio & Majestic

[57] ABSTRACT

Conventional directional control valves and the like normally include relatively complex and spatially separated centering and detent mechanisms for selectively maintaining a valve spool at centered and detent-held positions, respectively. Such valves are normally bulky and the casings therefor, primarily since they require machining, cannot be manufactured by die-casting methods. This invention overcomes the above problems by providing for the precise positioning of a valve spool (11) in its centered position by interassociating and engaging a centering mechanism (17) with a detent mechanism (30) by a stop (27), defined on a retainer (24) of the detent mechanism (30).

7 Claims, 2 Drawing Figures

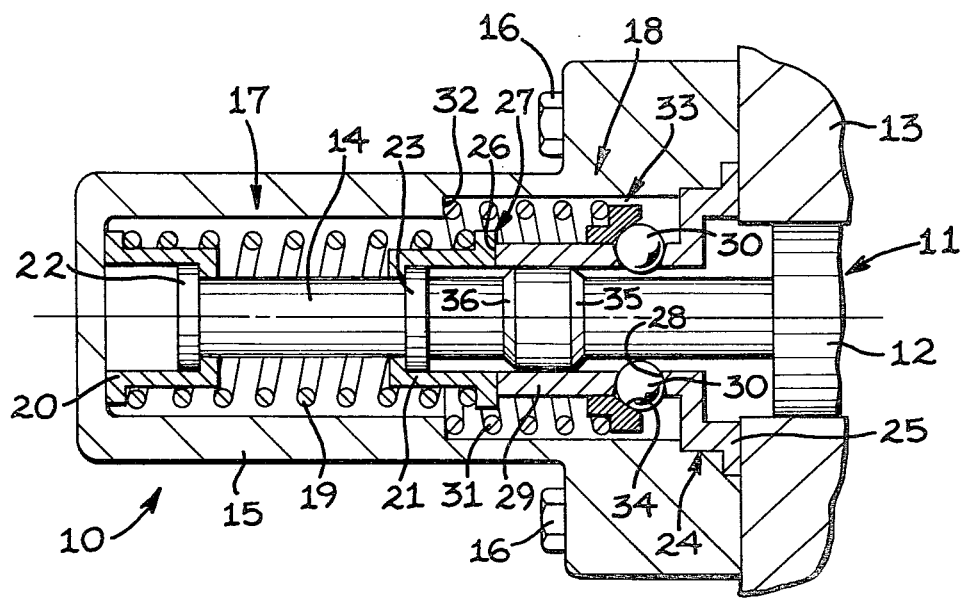
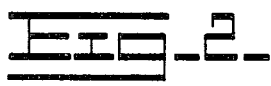
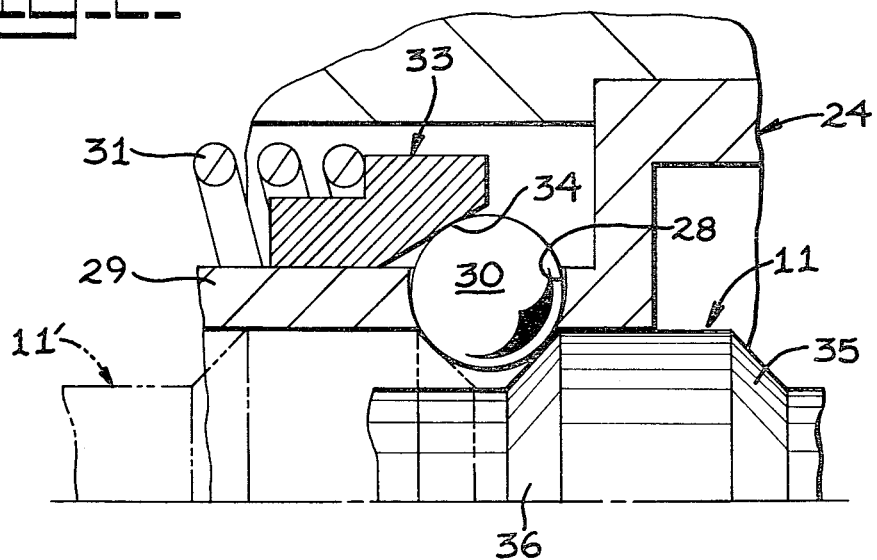

CONTROL VALVE WITH IMPROVED CENTERING AND DETENT MECHANISMS

DESCRIPTION

1. Technical Field

This invention relates to centering and detent mechanisms for holding a valve spool in set positions upon actuation thereof.

2. Background Art

A control valve employed in a fluid control circuit and the like oftentimes includes a detent mechanism for holding a spool thereof in a set position. When the spool is released from the detent mechanism, a spring-biased centering mechanism normally moves the spool to a neutral position automatically. The neutral or centered position of the spool is normally determined by accurately machining retainers for the centering spring.

The component parts of a conventional control valve of this type, including its centering mechanism and a retainer having detents of the detent mechanism mounted thereon, are physically separated at a substantial distance to provide a rather bulky, integrated valve package. In addition, the casing and related components of the valve require precise machinery and the utilization of snap rings and the like to fix the position of the retainer in the casing, for example. In addition to rendering the integrated construction quite complex, the casing does not lend itself to manufacture by relatively economical die-casting methods or the like. Furthermore, prior art valve packages of this type do not always ensure expeditious assembly and disassembly for servicing purposes.

DISCLOSURE OF THE INVENTION

The present invention is directed to overcoming one or more of the problems as set forth above.

In one aspect of this invention, a valve, comprises a housing having a spool movable between first and second positions therein, detent means for releasably holding the spool in its second position, retainer means, independent of the spool, for mounting the detent means thereon, first biasing means for moving the spool to its first position upon its release by the detent means and, stop means defined on the retainer means, for engaging the first biasing means to maintain the spool in its first position. The first biasing means includes a first compression coil spring and the detent means includes a second compression coil spring disposed concentrically and in overlapping relationship relative to the first compression coil spring.

In another aspect of this invention, a first end of the first biasing means engages the spool to move it towards its first position and a second end thereof engages the stop means.

The structurally integrated valve is thus compact to facilitate expeditious assembly and disassembly for servicing purposes and functions to precisely maintain the spool thereof in its first position whereby the above, briefly described problems relating to the utilization of standard centering springs and centering mechanisms are voided. The relative non-complexity of the valve lends itself to manufacture by economical die-casting methods. Also, the first or neutral position of the spool can be easily varied by simply changing the length of the retainer, having the stop means defined thereof.

BRIEF DESCRIPTION OF THE DRAWING

Other objects and advantages of this invention will become apparent from the following description and accompanying drawing wherein:

FIG. 1 is a longitudinal sectional view through a valve embodiment of the present invention, including an improved detent mechanism; and FIG. 2 is an enlarged sectional view of the detent mechanism.

BEST MODE OF CARRYING OUT THE INVENTION

FIG. 1 partially illustrates a control valve 10 having a spool 11 reciprocally mounted therein. The valve may be of any standard type, such as operator or pilot actuated, wherein spool 11 has a plurality of metering slots, lands, or the like formed thereon to intercommunicate various passages in the valve. Although valve 10 is shown in the form of a two-position valve, wherein spool 11 is adapted to be moved from its first or centered position illustrated in FIG. 1 to a second or detent-held position in FIG. 2, it should be understood that additional positions of the valve may be designed therein, as required.

A main body 12 of spool 11 is reciprocally mounted in a housing 13. An elongated stem 14 of the spool extends from main body 12 into a separate casing 15 which is secured to housing 13 by a plurality of bolts 16. For discussion purposes herein, attached housing 13 and casing 15 may be considered together as comprising a "housing."

A biasing means or centering mechanism 17 is associated with spool 11 to move it towards it first or centered position illustrated in FIG. 1 automatically upon release of the spool by a detent means or mechanism 18. Centering mechanism 17 comprises a compression coil spring 19 which is disposed axially between first and second cup-shaped retainers 20 and 21, each reciprocally mounted on stem 14 of spool 11. Flanges 22 and 23 are provided on stem 14 to engage retainers 20 and 21, respectively.

Detent mechanism 18 comprises a tubular retainer 24, having an annular flange 25 thereof clamped between housing 13 and casing 15 to precisely position an end surface 26 thereof at a set axial distance from casing 13 to provide a stop means 27, the function of which is hereinafter fully described. A plurality of circumferentially spaced holes 28 are formed through a tubular extension 29 of retainer 24 to mount ball-type detents 30 therein. Detents 30 are urged radially inwardly into seating engagement within holes 28 by a compression coil spring 31, disposed between an annular shoulder 32 defined on casing 15 and a ring 33 having a frusto-conically shaped surface 34 defined thereon to engage balls 30. Ring 33 is slidably mounted on retainer 24 whereby spring 31 will continuously apply a force thereto and against detents 30.

It should be noted in FIG. 1 that, when spool 11 is maintained in its illustrated first or centered position, an end of retainer 21 of centering mechanism 17 will engage end surface 26 of retainer 24. Thus, stop means 27, defined by this surface engagement, will precisely position spool 11 within housing 13 to ensure that spool 11 is maintained in its desired, centered position therein.

When spool 11 is moved rightwardly from its phantom line position 11' to its solid line position illustrated in FIG. 2, a frusto-conically shaped first ramp surface 35, defined on stem 14 of spool 11, will engage detents 30 to move them radially outwardly against the opposed biasing force of spring 31. The detents will thus ride over surface 35 and then move radially inwardly automatically to engage a frusto-conically shaped second ramp surface 36 of the spool to hold the spool in its second or detent position. Release of spool 11 from detent mechanism 18 will permit centering spring 19 to return the spool automatically back to its first position illustrated in FIG. 1. It should be noted in FIG. 1 that holes 28 and balls 30 are constructed and arranged to maintain the balls out-of-contact with respect to outer surface portions of stem 14, excepting the outer surface portions between ramp surfaces 35 and 36, to reduce frictional drag and wear on the spool.

INDUSTRIAL APPLICABILITY

Partially illustrated valve 10 finds particular application to fluid control circuits wherein the valve is employed as a directional control valve for selectively controlling the flow of fluid therethrough upon actuation thereof. Valve 10 is built on a modular concept whereby assembly and disassembly thereof for servicing purposes is accomplished by merely removing bolts 16 to detach casing 15 from housing 13.

In operation, when spool 11 is shifted rightwardly from its FIG. 1 position to its solid line position in FIG. 2, detents 30 will engage ramp surface 36 of spool 11 to retain it in a set position of operation, under the biasing force of spring 31 and intermediate ring 33. When spool 11 is moved leftwardly in FIG. 2, detents 30 will move outwardly on ramp surfaces 36 to permit spring 19 to automatically return spool 11 to its FIG. 1 first or centered position.

Stop means 27 will ensure, in conjunction with the bottoming-out of retainer 20 on an end of casing 15, that spool 11 is retained in its centered or neutral position of operation. The concentric disposition of springs 19 and 31, whereby they at least partially overlap longitudinally, aids in the compact structural relationship of the component pats of valve 10.

It should be again noted that casing 15 can be die-cast or otherwise suitably formed to avoid the utilization of a relatively more complex integrated construction, including the utilization of snap rings and the like. Also, the axial length of tubular extension 29 of retainer 24 may be varied to selectively position stop means 27 to precisely center spool 11 at any desired axial position, depending on the particular valve application.

Other aspects, objects, and advantages of this invention can be obtained from a study of the drawing, the disclosure and the appended claims.

I claim:

1. In a valve (10) having spool means (11) for movement between at least first and second positions, detent means (30) for releasably holding said spool means (11) in its second position upon movement thereof from its first position, retainer means (24) for mounting said detent means (30) thereon, said retainer means (24) being separate from said spool means (11), first biasing means (17) for moving said spool means (11) to its first position in response to release thereof by said detent means (30), and stop means (27) for engaging said first biasing means (17) to maintain said spool means (11) in its first position, said stop means (27) being defined on said retainer means (24), said detent means (30) including a plurality of circumferentially disposed detents (30) each mounted in a hole (28) defined through said retainer means (24), and second biasing means (31) for urging said detents (30) radially inwardly toward said spool means (11), the improvement comprising:

said first biasing means (17) including a first compression coil spring (19) and said detent means (30) including a second compression coil spring (31) disposed in concentric and overlapping relationship with respect to said first compression coil spring (19).

2. The valve (10) of claim 1 further including a housing (13,15) having said retainer means (24) secured thereto.

3. The valve (10) of claim 2 wherein said retainer means (24) includes a tubular extension (29) and wherein said stop means (27) includes an end surface (26) defined on said extension (29) to engage said biasing means (17) when said spool means (11) is in its first position.

4. The valve (10) of claim 3 wherein said biasing means (17) includes first (20) and second (21) retainers reciprocally mounted on said spool means (11) and spring means (19), disposed between said retainers (20,21), for urging said spool means (11) towards each of its first and second positions.

5. The valve (10) of claim 4 further comprising first (22) and second (23) flange means on said spool means (11) for engaging said first (20) and second (21) retainers, respectively.

6. The valve (10) of claim 1 wherein said detents (30) are disposed in out-of-contact relationship relative to said spool means (11) when said spool means (11) is in its first position.

7. A valve (10) comprising
a housing (13),
a spool (11) mounted for movement between at least first and second positions in said housing (13)
first biasing means (17) having a first end engaging said spool for moving said spool (11) towards its first position,
a retainer (24) secured to said housing (13) and having at least one hole (28) defined therethrough,
a detent (30) mounted in said hole (28),
second biasing means (17) for urging said detent (30) into engagement with said spool (11) to releasably hold it in its second position upon movement thereof from its first position, and
stop means (27) for engaging a second end of said first biasing means (17) to maintain said spool (11) in its first position, said stop means (27) being defined on said retainer (24).

* * * * *